United States Patent

Monteillet

[11] 4,318,308
[45] Mar. 9, 1982

[54] CABLE TENSION REGULATORS

[75] Inventor: Denis Monteillet, Saint Bartheleny de Vals, France

[73] Assignee: Societe Anonyme de Recherches de Mecanique, Saint Vallier sur Rhone, France

[21] Appl. No.: 101,129

[22] Filed: Dec. 7, 1979

[30] Foreign Application Priority Data

Dec. 13, 1978 [FR] France ................... 78 35719

[51] Int. Cl.³ .............................................. F16C 1/10
[52] U.S. Cl. ............................ 74/501.5 R; 244/232; 440/62
[58] Field of Search ............ 74/561.5 R, 501 R, 503, 74/510, 527, 533, 535, 586, 96; 474/101, 109, 111; 114/144 R, 160; 440/62; 244/232, 233, 224, 75 R

[56] References Cited

U.S. PATENT DOCUMENTS

| | | | |
|---|---|---|---|
| 2,810,300 | 10/1957 | Pigford | 74/501.5 |
| 2,934,971 | 5/1960 | Phelan | 74/501.5 |
| 3,277,738 | 10/1966 | Glauser et al. | 74/501.5 |
| 3,316,775 | 5/1967 | Wrighton et al. | 74/501.5 |
| 3,919,897 | 11/1975 | Yang | 74/501.5 |
| 3,943,794 | 3/1976 | Shimada | 74/501.5 |
| 4,066,154 | 1/1978 | Ross | 74/501.5 X |
| 4,170,147 | 10/1979 | Durno et al. | 244/233 X |
| 4,197,763 | 4/1980 | Yamada | 74/501.5 |
| 4,198,877 | 4/1980 | Holing | 74/501.5 X |

FOREIGN PATENT DOCUMENTS

| | | | |
|---|---|---|---|
| 658772 | 10/1951 | United Kingdom | 74/501.5 |
| 906435 | 9/1962 | United Kingdom | 74/501.5 |

*Primary Examiner*—C. J. Husar
*Assistant Examiner*—Moshe I. Cohen
*Attorney, Agent, or Firm*—Haseltine and Lake

[57] ABSTRACT

There is provided a cable tension regulator having a pivotable hub which is rigid with an operating lever. Two quadrants are pivotably mounted on the hub and have fixed on their peripheries respective cables for connection to a control or controlled element. Resilient means urge the quadrants to pivot in the direction corresponding to tensioning of the cables. Means are provided for locking the quadrants on the hub when an additional traction is exerted on one of the cables by the control element and for releasing the quadrants when the tensions of the two cables change simultaneously. Each quadrant is pivotably mounted on the hub by means of a disengageable one-way coupling which prevents, when in operation, the quadrant from pivoting under the effect of the resilient means. There is provided means for disengaging the one-way coupling when the respective cable is taut.

2 Claims, 4 Drawing Figures

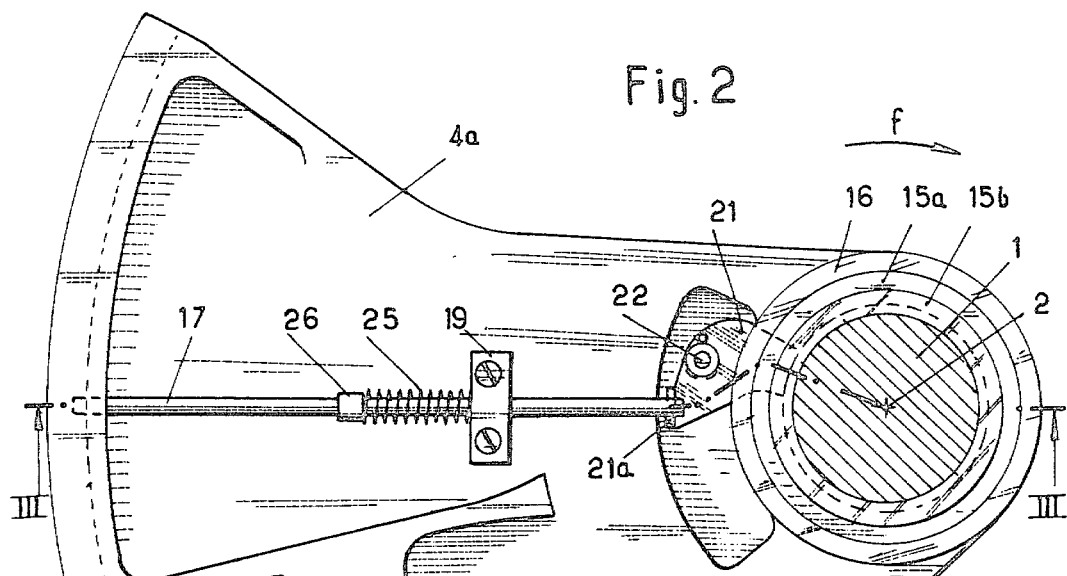
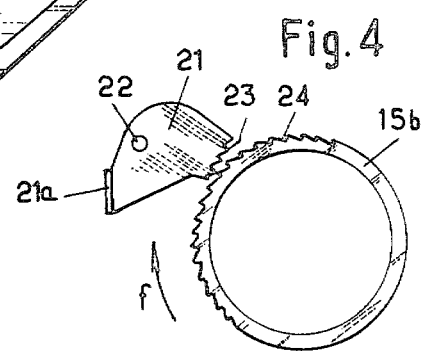
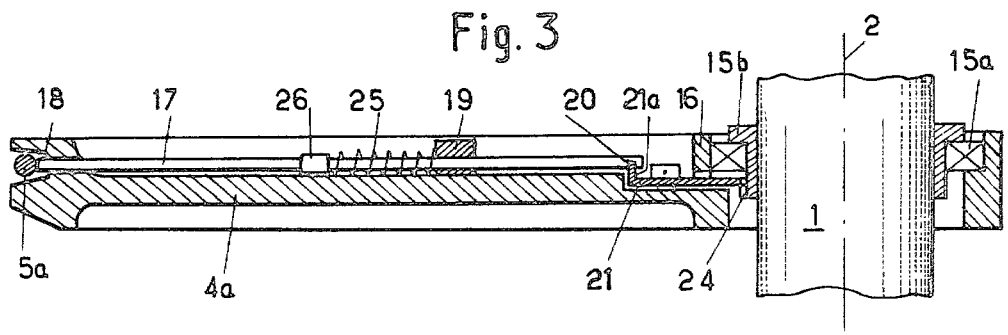

CABLE TENSION REGULATORS

The present invention relates to cable tension regulators, for instance of the type comprising a hub which is pivotably mounted on a fixed structure and is rigid with an operating lever, two quadrants which are themselves pivotably mounted on the hub and to the periphery of each of which is fixed a cable connected to a control element or an element to be controlled, resilient means for causing the quandrants to pivot in the direction corresponding to a tensioning of the cables, and means for locking the quadrants on the hub when an additional traction is exerted on one of the cables by way of the control element and for releasing them when the tension on both cables decreases or increases simultaneously.

Regulators of this type may be installed in an aircraft. In this case the cables may be connected to a control element whereas the lever serves to operate a directional control. Alternatively, the cables may be connected to the directional control, operational control being effected by the lever. When the length of the aircraft varies as a result of a change in external temperature, the quadrants pivot on the hub under the effect of the resilient means so as to maintain the tension exerted on both cables at a constant, equal level; the operating lever remains stationary.

In contrast, if additional traction is exerted on one of the cables by way of the control element, provided for example in the form of a rudder bar, both quandrants lock on the hub such that the hub and the operating lever are driven, actuating the directional control, until the user has ceased to displace the rudder bar and the additional tractive force has ceased. The operating lever and the directional control thus occupy a new position corresponding to that displaced by the rudder bar.

It is possible that one of the cables may break or shear during the actuation of the rudder bar. If this is not the cable on which the rudder bar exerts an additional force nothing happens while the pilot is maintaining the rudder bar in position, as the quadrants remain locked. However, as soon as the pilot ceases actuation, the quadrants are unlocked and pivot under the action of the resilient means taking up their position corresponding to maximum extension of the cables and returning the rudder bar to its initial position and possibly beyond this. If the pilot wishes to return the rudder bar to the position in which he had placed it, this movement causes a further displacement of the directional control, which is therefore more considerable than anticipated and the pilot is unable to move the directional control in the opposite direction in order to return it to the desired position. If the cable which breaks is the one on which a force was being exerted by the rudder bar, both quadrants remain locked and only pivot by a small angle corresponding to a take-up play as long as the pilot exerts a retaining force on the other end of the rudder bar. However, as soon as this retaining force ceases, the quadrants are unlocked and take up their position corresponding to maximum extension of the cables; at the same time the directional control is displaced by a certain angle in the opposite direction to that desired by the pilot, causing a displacement of the directional control.

Similar drawbacks occur when the regulator is mounted in the opposite way, i.e. when the directional control is connected to the cables and the regulator is controlled by the lever.

According to the invention there is provided a cable tension regulator comprising a pivotable hub which is rigid with an operating lever, two quadrants which are pivotably mounted on the hub and on the periphery of each of which is fixed a cable for connection to a control element or an element to be controlled, resilient means for causing the quadrants to pivot in the direction corresponding to tensioning of the cables, and means for locking the quadrants on the hub when an additional traction is exerted on one of the cables by way of the control element and for releasing the quadrants when the tensions on the two cables decrease or increase simultaneously, each of the quadrants being pivotably mounted on the hub by means of a disengageable one-way coupling which prevents, when in operation, the quadrant from pivoting under the effect of the resilient means, there being provided means for disengaging the one-way coupling when the respective cable is taut. Such a cable tension regulator can counter to a large extent the drawbacks resulting from the breaking of a cable.

If none of the cables is broken, the one-way couplings are disengaged and the tension regulator functions normally; however, if one of the cables break, the quadrants are unable to pivot about the hub under the action of the resilient means; the directional control and the rudder bar remain in the position to which the pilot has moved them.

Preferably, the one-way coupling comprises a substantially radial release rod which is slidably mounted with respect to the quadrant, one end of which rod can project into a groove provided on the periphery of this quadrant for the passage of the cable, the coupling being in an active position when this end projects into the groove and in an inactive position when it is retracted into the quadrant, and resilient means arranged to displace the rod to cause the one end to project into the groove.

When the cable is not broken, the end of the rod is maintained in the retracted position by the cable and the one-way coupling is disengaged. However, if the cable breaks, the rod is released, its end projects into the groove and the coupling is engaged.

The invention will be described, by way of non-limiting example, with reference to the accompanying drawings, in which:

FIG. 2 is an elevation of one of the quadrants;

FIG. 3 is a section along the line III—III of FIG. 2; and

FIG. 4 shows a detail in elevation on a larger scale.

Figure 1:
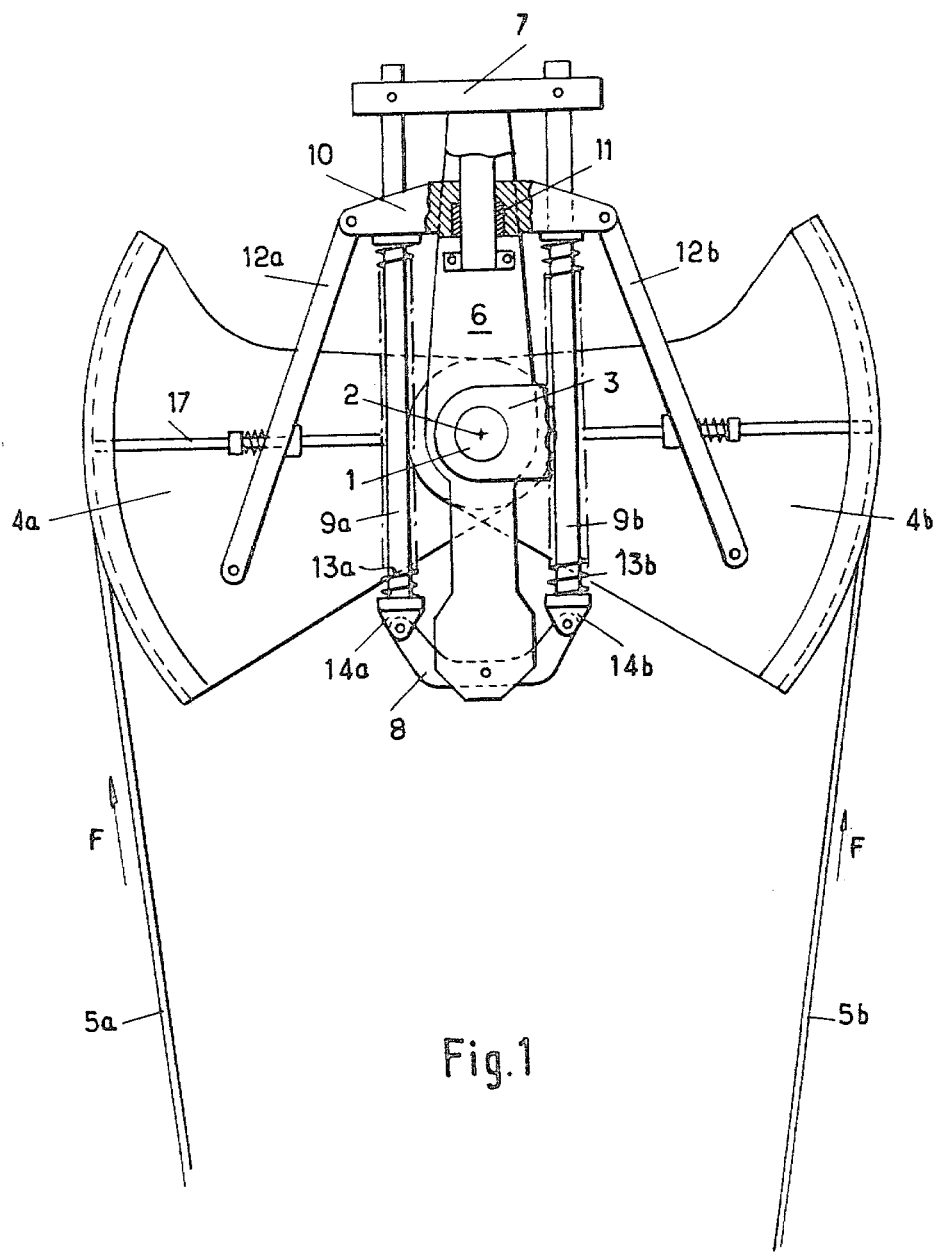
FIG. 1 is a diagrammatic elevation of a regulator assembly.

As shown in FIG. 1, a cable tension regulator comprises a hub 1 which is pivotably mounted about an axis 2 on a framework (not shown) and is rigid with an operating lever 3. Two quadrants 4a and 4b are pivotably mounted on the hub 1, two cables 5a and 5b being fixed on the periphery of the quadrants and being connected to a rudder control bar (not shown).

The hub 1 is rigid with an axial tube 6 having at each of its ends a cross-bar 7,8. The two cross-bars 7 and 8 are connected to one another by way of two guide tubes 9a and 9b.

A movable cross-bar 10 is slidably mounted on the tube 6 with the interposition of a locking sleeve 11, and, with a certain play, on the tubes 9a and 9b. One of its ends is connected by way of a connecting rod 12a to the quadrant 4a whilst its other end is connected by way of a connecting rod 12b to the quadrant 4b. Two compression springs 13a and 13b, of the same force, are mounted on the tubes 9a and 9b between the movable cross-bar 10 and stops 14a and 14b fixed to the tubes 9a and 9b.

The springs 13a and 13b are designed to displace the cross-bar 10 upwardly whilst maintaining it perpendicular to the tube 6. They are consequently designed to cause the quadrants 4a and 4b to pivot until the cross-bar 10 abuts against the cross-bar 7 and thus to exert on each of the cables 5a and 5b a certain tensioning force representing by the force F. If, as a result of a temperature decrease, the distance between the axis 2 and the rudder control bar decreases, the tensions of both cables decrease simultaneously. However, the springs 13a and 13b which maintain the cross-bar 10 perpendicular to the tube 6 then cause the two quadrants 4a and 4b to pivot simultaneously and in the opposite direction in such a way that the two tensions resume their initial value F. On the other hand, if the distance between the axis 2 and the rudder control bar increases, the tensions of both cables tend to increase simultaneously; the cross-bar 10 is displaced such that the quadrants 4a to 4b pivot and the tensions of the cables resume their initial value. Thus, the device exerts a constant tension F on the cables 5a and 5b, this tension being a function of the initial compression of the springs 13a and 13b, even if the distance between the axis 2 and the rudder control bar varies.

In contrast, if the rudder control bar is moved, the tension of the cable 5a, for example, increases. As a result of this differential force, the cross-bar 10 tends to skew and jams on the tube 6. The cable 5a then causes the assembly to pivot about the axis 2 by entraining the lever 3 until the tensions of both cables 5a and 5b are again both equal to F. A position of the lever 3 thus corresponds to a position displayed by the rudder bar.

Each of the quadrants, for example the quadrant 4a, is mounted on the hub 1 by way of a bearing 15a, the outer cage of this bearing being fixed in a flange 16 of the quadrant and rigid with this flange whereas its internal cage is mounted on a ring 15b rigid with the hub 1.

One of the ends of a rod 17 can pass through a groove 18 provided at the periphery of the quadrant 4a for the passage of the cable 5a and radially slidably mounted in a bearing 19 fixed on the quadrant. The other end of the rod 17 comprises a slot 20 in which an eccentric flange 21a of a locking lever 21 is engaged, the lever being pivotally mounted at 22 on the quadrant.

The lever 21 traverse the flange 16 and has at its free end a toothed surface 23 which can mesh with a toothed surface 24 provided on the periphery of the inner ring 15b of the bearing. A spring 25 interposed between the bearing 19 and a stop 26 rigid with the rod 17 tends to displace this rod radially outwardly which causes the rod 17 to project into the groove 18 and causes the lever 21 to pivot such that it applies its toothed surface 23 against the toothed surface 24 of the bearing element 15b. The teeth of these toothed surfaces are disposed and oriented in such a way that they prevent, when in contact, the quadrant 4a from pivoting in the direction of the arrow f under the effect of the force exerted by the springs 13a and 13b and which is transmitted to the quadrant by the connecting rod 12a, but enable it to pivot in the opposite direction.

The quadrant 4b is disposed in the same way as the quadrant 4a.

When the cables 5a and 5b are normally taut, they bear against the base of the grooves 18 and push the rods 17 back against the action of the springs 25. The rods 17 maintain the levers 21 in positions in which their toothed surface 23 is disengaged from the toothed surface 24 of the bearing element 15b. The quadrants 4a and 4b may thus pivot freely with respect to the hub 1 and the cable tensioning device operates in the above-described manner.

If the cable 5a breaks when the rudder control bar exerts an additional pull on the cable 5b, the rod 17 of the quadrant 4a is displaced under the action of the spring 25 and the toothed surface 23 meshes with the toothed surface 24, which prevents the quadrant 4a from being displaced with respect to the hub 1 in the direction of the arrow f under the action of the springs 13a and 13b and, consequently, also prevents the quadrants 4b from being displaced with respect to said hub. Subsequently, when the pilot ceases to act upon the rudder control bar, the quadrants remain stationary and the lever 3 remains in the position corresponding to the position of the rudder bar.

In a similar way, if the cable 5a breaks when the rudder bar exerts an additional pull on it, the quadrant 4a cannot move backwards with respect to the hub. The assembly of the quadrants and the hub pivots under the effect of the traction to which the cable 5b is subjected; this traction very rapidly becomes zero such that the hub only pivots by a very small angle and the lever 3 moves only very slightly.

The present invention is not limited to the embodiment which is described and illustrated but, in contrast, covers all its variants.

I claim:

1. A cable tension regulator comprising a pivotable hub, an operating lever rigid with said hub, two quadrants each having a periphery, resilient means, locking means, two disengageable oneway couplings, and disengagement means, said two quadrants being pivotably mounted on said hub with said periphery of each said quadrant being fixed to a cable for connection to a control element or an element to be controlled, said resilient means causing said quadrants to pivot in the direction corresponding to tensioning of said cables, said locking means locking said quadrants on said hub when an additional traction is exerted on one of said cables by way of said control element and releasing said quadrants when the tensions on said two cables decrease or increase simultaneously, each of said quadrants being pivotably mounted on said hub by means of a respective one of said disengageable one-way couplings which prevents, when in operation, said quadrant from pivoting under the effect of said resilient means, said disengagement means disengaging said one-way coupling when the respective cable is taut and each of said one-way couplings comprises a substantially radial disengagement rod which is slidably mounted with respect to said respective quadrant, said rod having an end which can project into a groove defined by said periphery of said quadrant, said coupling being in an active position when said end of said rod projects into said groove and in an inactive position when retracted into said quadrant, there being provided resilient means urging said rod so that said end thereof tends to project into said groove.

2. A regulator as set forth in claim 1, wherein said disengageable coupling comprises a ring having a periphery provided with a toothed surface and rigid with said hub, and a lever pivotably mounted on said quadrant and having an end provided with a toothed surface for meshing with said toothed surface of said ring.

* * * * *